United States Patent

Ivanics

[11] Patent Number: 4,745,318
[45] Date of Patent: May 17, 1988

[54] INDUCTION MOTOR WITH SECONDARY ROTOR

[75] Inventor: László Ivanics, Budapest, Hungary

[73] Assignee: Ipari Muszergyar Iklad, Hungary

[21] Appl. No.: 40,949

[22] Filed: Apr. 21, 1987

[30] Foreign Application Priority Data

Apr. 22, 1986 [HU] Hungary ................. 1670/86

[51] Int. Cl.⁴ .................. H02K 21/08; H02K 17/02
[52] U.S. Cl. .................. 310/114; 310/125; 310/126; 310/156
[58] Field of Search .......... 310/67, 114, 125, 156, 310/211, 266, 126

[56] References Cited

U.S. PATENT DOCUMENTS

| | | | |
|---|---|---|---|
| 2,542,659 | 2/1951 | Gillett | 310/266 |
| 3,445,699 | 5/1969 | Beaudry et al. | 310/125 |
| 4,137,473 | 1/1979 | Pfister | 310/156 |
| 4,454,438 | 6/1984 | Yamashita et al. | 310/156 |

FOREIGN PATENT DOCUMENTS 283388 12/1970 U.S.S.R. ................. 310/114

Primary Examiner—Patrick R. Salce
Assistant Examiner—D. L. Rebsch
Attorney, Agent, or Firm—Handal & Morofsky

[57] ABSTRACT

An induction motor having a stator with a stator winding, and a rotor coupled with a shaft 10 and separated from the stator by an air gap 13, wherein the rotor includes a current conducting element 5,15 and a magnetically excitable member 4, and in the air gap 13 formed between the stator and the magnetically excitable member 4, a rotary element 6 is arranged, made from a permanent magnetic material and supported freely running with respect to the rotor.

9 Claims, 4 Drawing Sheets

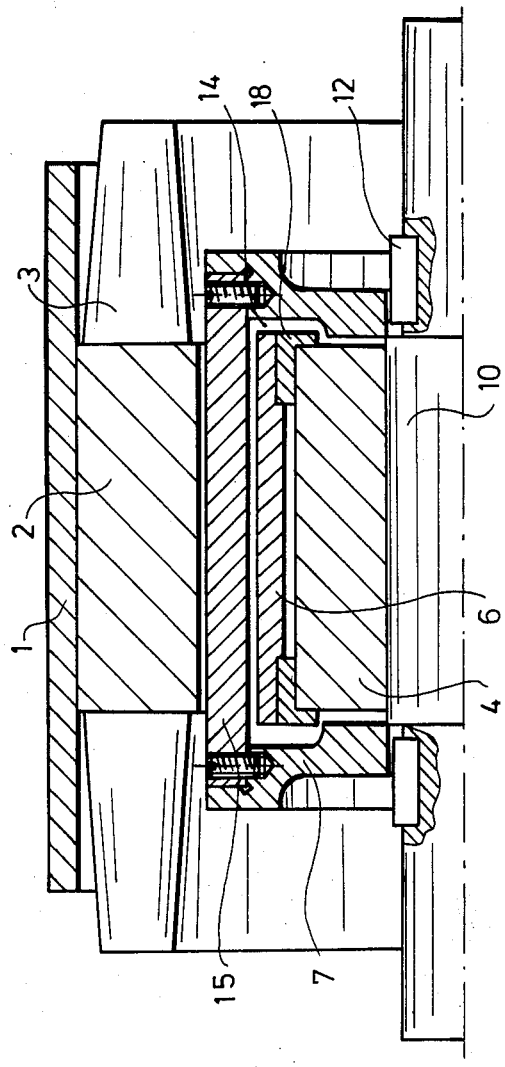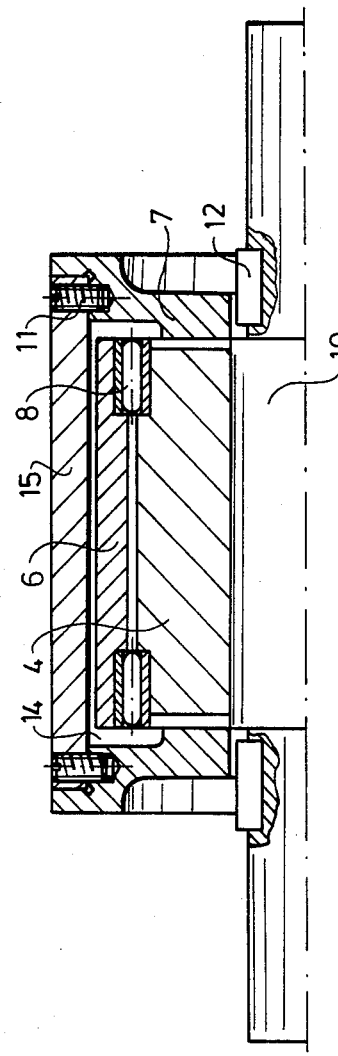

INDUCTION MOTOR WITH SECONDARY ROTOR

FIELD AND BACKGROUND OF THE INVENTION

The present invention relates to an induction motor which comprises a stator having a stator winding and a rotor coupled to the motor shaft and separated from the stator by an air gap. With the induction motor according to the present invention the power factor can be selected over wide adjustable ranges as desired.

Induction motors are among such electrical machines that have a stator having a stator winding, and a rotor which has a winding in which the rotor current becomes induced through the stator winding. The induction motors can have a very simple construction, having a cage-type rotor (shorted rotor), wherein the cage comprises rods and wherein the rods at the end of the rotor are coupled by a ring (shorting ring).

The efficiency of electric motors can be defined by the relationship of the useful output which can be taken off from their shaft, with respect to the power supplied from the network to the motor. In induction motors the efficiency depends on the voltage, the current and the phase angle. The effective output which can be taken off of the shaft depends on various factors. It is clear that the efficiency, by reducing the power which is taken out of the network, will improve the effective output if it remains at an unchanged or nearly unchanged value. A large portion of the received power is taken up by the VAR, which can be limited by appropriate and complex capacitor arrangements. The use of compensating capacitors for the VAR control means a worsening of the operating conditions and an increase of the manufacturing costs of induction motors. The VAR depends from the supply voltage and the supply current, as well as from the power factor, wherein the power factor represents the cosine of the phase angle difference appearing between the current and the voltage.

The improvement of the power factor has been a subject of many inventions. In addition to using capacitor units, there are different solutions known, such as the use of the hysteresis motor according to German Pat. No. 32 32 914. In that a rotor is proposed in the form of a hollow cylinder and made from a permanent magnet, which is subjected to a radial magnetization during the operation of the motor. By an appropriate selection of the thickness of the walls, one may attain that nearly all of the magnetic circuits become closed through the air gap of the motor, resulting in an improvement the power factor.

The disadvantage of the known solution resides in that the power factor can be adjusted only rather inaccurately; that is, for various motors having similar construction, different power factors will be present.

Similar disadvantages are associated with the reluctance generator illustrated in German Pat. No. 28 32 165. In this patent the use of a generator shaft made from permanent magnetic material is proposed. The rotor of the generator is coupled with this shaft, which also carries an element deflecting the magnetic flux. The magnetic flux of the exciter winding will be concentrated in the middle portion of the generator, whereby the lowest magnetic resistance is overcome, so that a element deflecting the flux and made from a ferromagnetic material can be placed occupy the middle portion of the exciter winding.

In the patent literature proposals can be found according to which in the inner space of a stator of a motor, several rotatable elements are arranged. However, as can be seen in the following, only special situations and with special motors can be solved with those proposals.

The provision of an additional rotor is, for example, known from German published application No. 30 45 820 (Siemens). Such proposal requires the provision of a cage rotor, as an outer rotor, on the motor shaft and its concentric arrangement with an inner rotor provided with a winding, wherein the outer rotor and the stator are connected to an outside voltage source. As a result a variable speed for the rotor can be set. A motor built according to the above is a special machine, wherein an increase in the power factor cannot be attained.

In application WO No. 85/03174 (Bosch) the subdivision of the cage into two portions is proposed, namely, for an outer cage and a freely running inner part made from a ferromagnetic material. As a result, a single phase motor is created having a small output and two or four poles, wherein the increase of the power factor is not intended and cannot be attained under practical operating conditions.

OBJECT AND SUMMARY OF THE INVENTION

The object of the present invention is to improve the efficiency of induction motors with simple matters, that is, to provide an induction motor the power factor of which can be set at preselected operating point having a predetermined value and retaining same very accurately.

The invention rests on the recognition that an increase and adjustability of the power factor can be attained by the use of an additional rotary means in the rotor, so far it is prepared from a ferromagnetic material and supported in a free running manner with respect to the rotor.

For achieving the above object, an induction motor is provided, comprising a stator having a stator winding, as well as the rotor coupled with a motor shaft and separated from the stator by an air gap, wherein the rotor is provided with a current conducting element as well as with a magnetically excited member, wherein according to the present invention, in the air gap between the stator and the body of the rotor a rotary element made from a permanent magnetic (premagnetized ferromagnetic) material and supported in a free running manner with respect to the rotor, is provided and which is arranged with respect to the rotor coaxially either outside the current conducting element (of the cage or of the winding) of the rotor, or in an air gap between the current conducting element and the magnetically excited body of the rotor.

As it is known now, the induction motor can be constructed with an inner rotor, intermediate rotor or with an outside rotor. Accordingly, the rotary element on the rotor can be journalled either on the outer upper surface, or on the body, on the motor shaft, or in the event of using an outer rotor, on the stator.

The rotary element preferably is as long as the portion of the rotor which is mounted under it. It is preferred that the rotary element is formed as a roller-shaped casing, which may comprise, for example, thin ferromagnetic segments, and due to the premagnetization, can have the same number of poles, as the stator winding. The ferromagnetic segments which have been premagnetized in the radial direction, can be placed on the inner or outer upper surface of a metallic, made for example from aluminum, magnetically not excitable roller, such as by being glued thereto. The basic material of the segments can be, among others, iron, rare earth magnet (for example samarium-cobalt or neodimium based material).

A rotary element which is supported on the stator is preferably formed as a circular ring, which at the same time has been made from a ferromagnetic material which has been premagnetized in the radial direction. In the intermediate rotor the rotary element is a disc, which is journalled on the motor shaft and wherein the ferromagnetic material of the disc is premagnetized in the axial direction.

In the induction motor according to the present invention, if it includes a shorted rotor provided with a cage, it is preferred that the rotary element is supported by the shorting ring, wherein the shorting ring is fixedly coupled with the current carrying element. The support is in the form of a needle bearing or of a journal bearing.

In the induction motor according to the present invention which is a motor operated with asynchron numbers of revolutions, an additional synchronous rotor is provided, which is either mounted directly on the motor shaft or movably supported on the rotor and forms a member which moves freely in a synchronous fashion with respect to the magnetic rotating field of the motor and will contribute to the excitation of the rotor of the induction motor.

As a result the copper quantity of the motor and the power required for the excitation can be reduced and thereby the VAR taken out from the network is also reduced. Consequently, the energy take-up of the motor from the electrical network will be reduced. A further advantage resides in that the power factor can be set at a predetermined operating point and at a desired magnitude.

According to the solution proposed by the present invention the receiving of the effective power from the network with respect to the receiving of the VAR at the output of the network can be simplified, thereby the receiving of the VAR from the network by the system is reduced. The invention can be used with single or three-phase induction motors of any magnitude (for example, from 40 W up to 1000 KW) and especially in houseware motors.

BRIEF DESCRIPTION OF THE DRAWINGS

The invention will become further explained in the following on-hand of preferred embodiments which can be seen in the drawings, in which:

FIG. 3 is a cross-section of an induction motor according to the invention having an inner rotor and an inner air gap wherein an additional rotor is arranged, FIG. 4 is a cross section of the rotor shown in FIG. 3 according to the present invention having an inner rotor and an inner air gap, wherein an additional rotor is provided, without showing the stator.

Figure 5:
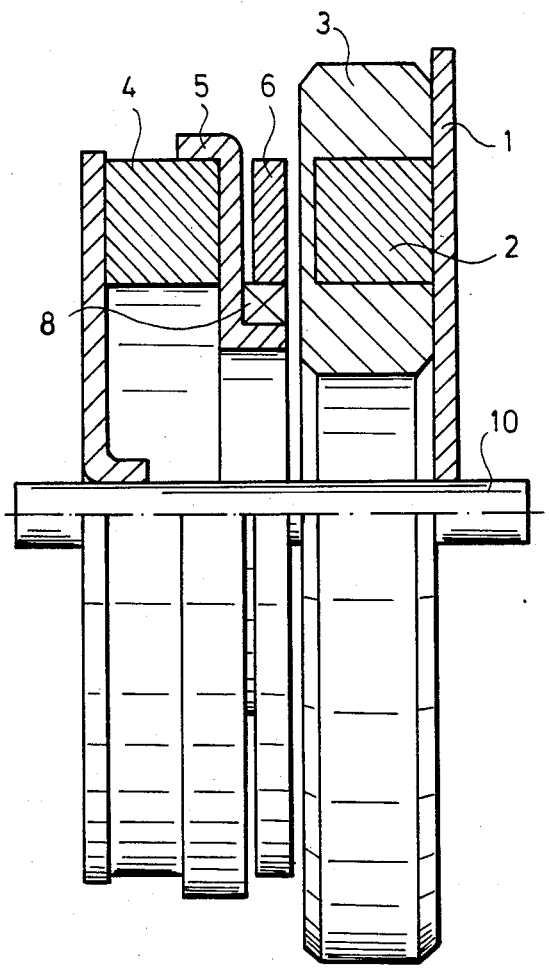
FIG. 5 is a longitudinal section of an induction motor according to the present invention having an intermediate rotor and an additional rotor arranged parallel therewith.

For a more detailed illustration a few embodiments of the induction motors will be selected in which the rotor is arranged in the inner space of the stator (FIGS. 1-4). The basic principle of the invention can, however, be used also in such induction motors in which the rotor is arranged outside the stator (FIG. 5).

In an induction motor having an inner or outer rotor generally and also according to the present invention, a housing 1 or a supporting plate is provided for securely supporting a stator 2 having a stator winding 3. On a motor shaft 10 fixedly coupled thereto and coaxial with the stator 2, a rotor is provided, which is constructed in a conventional manner with rotor windings 5 (FIGS. 1 and 5) or with a cage 15 (FIGS. 2-4). The rotor windings 5, respectively the cage 15, form together with a magnetically excited member 4 having a known construction (for example from punchings), and wherein between the stator 2 and the rotor an air gap 13 is provided.

The conventional motor construction according to the present invention is changed in such a manner that between the stator 2 and the magnetically excited member 4 an additional rotary element 6 is provided, which is freely rotatable with respect to the rotor, which is securely supported on the motor shaft 10. The rotor comprises therefore the member 4 and the rotor windings 5 or the cage 15 and the rotary element 6 which is freely running on the motor shaft 10 and is directly journalled thereon or on the member 4. The rotary element 6 is constructed from a permanent magnetic material and can be in the form of a roller or ring. The rotary element 6 is supported by a bearing, especially by a needle bearing 8 on the motor shaft 10 or on the first member 4, especially on the rotor winding 5 and is concentric with respect to the rotor.

Figure 1:
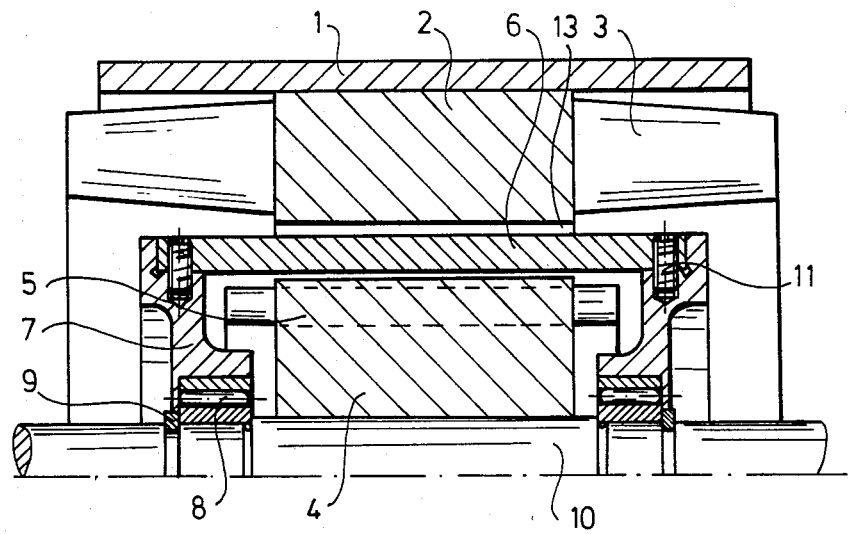
FIG. 1 is a cross-section of induction motor according to the invention having a rotor and an additional rotary element in the air gap of the motor.
Figure 2:
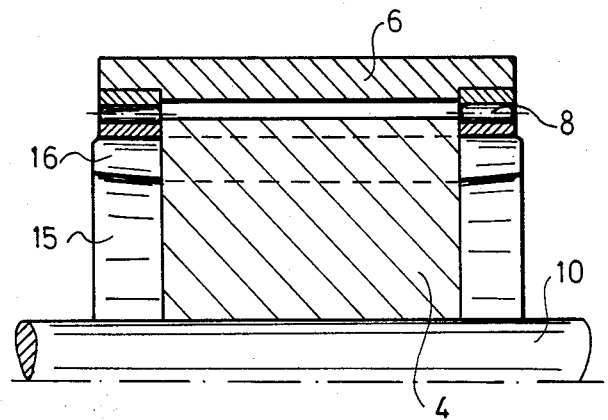
FIG. 2 is a cross-section of an induction motor according to the present invention having a rotor, on which a free running member is journalled as an additional rotor, without showing the stator.

As can be seen in FIG. 1, the disc 7 serves for the supporting of the roller-shaped rotary element 6, and which is journalled on needle bearing 8, which is cooperating with snap rings 9 and with one or more clamp bolts 11 in securing the rotary element 6 on the disc 7. Clearly other securing possibilities can be used, such as journal bearings 18 (FIG. 3) can be considered advantageous. The disc 7 comprises a light material, such as a synthetic material or aluminum, since it must be made from a nonferromagnetic material.

In some types the rotor of the induction motor is provided with a cage 15 (FIGS. 2, 3 and 4), wherein a shorting ring 16 is provided, which is fixedly coupled with the member 4. The shorting ring 16 serves to support the needle bearing 8 and offers the possibility of a simple construction for the rotary element 6.

As can be seen in FIG. 1, by using a split rotor, there will be two air gaps present in the inner space of the induction motor. The rotary element 6 will occupy one portion of the air gap 13 between the stator 2 and the rotor. Although the increasing of the air gap 13 will increase the magnetizing current of the induction motor, this can be, however, well compensated by an appropriate selection of the permanent magnetic material of the rotary element 6.

As can be seen in FIG. 3, an inner air gap 14 can be provided in the rotor, which will lie in or under the cage 15, but always above the member 4. The inner air gap 14 which, however, is not necessary by all means will receive the rotary element 6, which by being arranged in the inner air gap 14 closed from all sides is reliably protected against interferences.

The cage 15 comprises conventionally aluminum or other non-ferromagnetic metal (FIG. 3 or 4) and, in this embodiment, it is fixedly coupled by a clamping bolt 11 with the disc 7. The disc 7 is fixedly coupled with the motor shaft 10 by means of a groove tongue. As can be seen from FIG. 3 the journal bearing 18 can be replaced by needle bearings 8 according to FIG. 4.

In the induction motor according to the present invention having an intermediate motor according to FIG. 5, the stator 2 has no groove or slot and the stator winding 3 is imbedded in a synthetic resin; it forms an air gap winding. The rotary element 6 is in the form of a flat member arranged axially between the member 4 of the rotor fixedly secured on the shaft and between the stator 2. The plane of rotation of the rotor and of the rotary element 6 lie in this embodiment parallel with respect to each other. The rotary element 6 can be supported either on the stator 2 (for example on a circular disc-shaped projection thereof), or on the motor shaft 10 as shown also in FIG. 5, freely running on the rotor and journalled in the bearing 8.

In operation of the induction motor according to the present invention, the bearings (needle bearings 8 or journal bearings 18) will be loaded according to the difference between the number of rotation of an asynchronous motor and a synchronous motor. Therefore, the useful life of the bearing is very high. The energy requirement of the use of a rotary element 6 as a synchronously running member of the induction motor is very slight and will lead to a very small magnitude of the load angle, and independent whether the rotary element 6 is mounted inside or outside of the rotor.

The rotary element 6 as indicated, can be made roller-shape (FIGS. 1–4), disc-shape (FIG. 5) or ring-shape. The ring-shape construction is similar to the roller shape or disc-shape structure and depends only from the arrangement of the magnetic material on the rotary element as discussed in the following.

Figure 6:
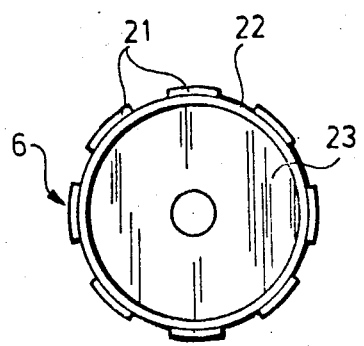
FIG. 6 is the front view of a rotary element in the form of a roller.
Figure 7:
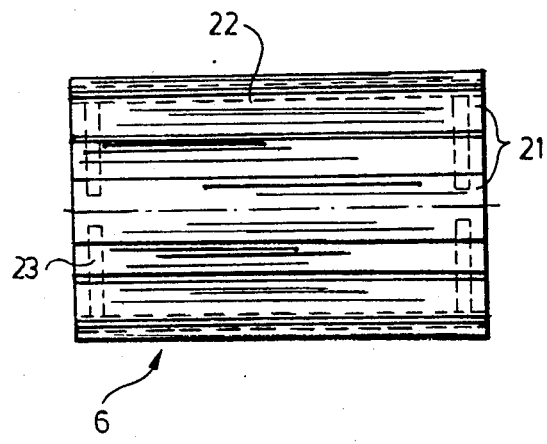
FIG. 7 is a side view of the rotary element according to FIG. 6.

The rotary element 6 according to FIGS. 6 and 7, is roller-shaped, and it serves as a casing surrounding the rotor and which is made from a light material, such as from synthetic material or aluminum, and it is closed on both sides by closing walls 23. The closing or limiting walls 23 are adjusted to the bearings 8 or 18 (such adjustment cannot be seen in FIGS. 6 and 7), and are coupled with a retaining cylinder 22 made from aluminum or synthetic material and preferably formed as a hollow body. On the inner or outer upper surface of the retaining cylinder 22 ferromagnetic segments 21 are glued-on which, for example, can be manufactured in a powder-metalurgical method. The segments 21 are preferably premagnetized, in a known manner, in a radial direction such that the number of the poles of the magnetic field is similar to the number of poles of the stator winding 3. When necessary, between the segments 22 air gaps can be prepared in the retaining cylinder 22. The retaining cylinder 22 can obviously form the rotary element 6, if it is made from a ferromagnetic material whereby the closing walls 23 can be made, for example, from a synthetic material.

The expensive, rare earth metal-based segments 21 (for example from cobalt-samarium mixture, neodimium) each can be made and arranged after each other and next to each other in a series form and with dimensions of $1.8 \times 4.5 \times 24$ mm, and in which construction a retaining cylinder 22 made from aluminum is provided having a wall thickness of, for example, 1.5 mm.

If the rotary element 6 is a disc, as shown in FIG. 5, then the segments 21 are glued on perpendicularly with respect to the motor shaft 10 and are premagnetized in the axial direction. The disc can be made also from a non-ferromagnetic material (with the glued-on ferromagnetic segments), or made from a ferromagnetic material (without segments). The roller-shaped rotary element 6 and also the disc-shaped or ring-shaped construction can be supported on the motor shaft 10 as well as on the stator, or on the rotor, whereby it must be adjusted to fit the particular motor construction.

From the above it can be seen that a rotary element 6 brings about an effect of increasing the air gap between the stator 2 and the rotor, which in itself will cause a slight worsening of the operating parameters (an increase of the magnetizing current). This effect follows from the fact that the rotary element requires an increase of the spacing between the stator and the rotor for its thickness. The thickness of the rotary element is on the average between 3–3.5 mm, however it can be larger at larger motor outputs. The presence of the ferromagnetic rotary element 6 is associated, however, with such advantages that the noted worsening can be fully compensated, since the present day modern ferromagnetic materials can have a very large coercive force.

In the induction motor according to the present invention the advantages of the synchronous motors and of the induction motors are united in such a fashion that the rotary element 6, being an additional rotary element will have a magnetic energy output whereby the magnetizing of the motor becomes much easier and less power from the network will be required for building up the magnetic main field (the rotary field). When the supply voltage is turned on (which can be single or three-phase type), in the stator winding a circularly symmetrical or elliptical magnetic field is created which rotates with a synchronous number of revolutions. Under this condition the rotor and the rotary element 6 will be accelerated to an asynchronous number of revolutions, and after attaining thereof, the rotary element 6 will be quickly brought up to the synchronous number of revolution. Under this condition the rotary elements 6 will create an excitation which will contribute to the magnetic main field of the motor. By an appropriate selection of the materials, the magnetic excitation between the stator and the rotor can be substantially increased. The acceleration of the rotary element can be improved by the presence of a magnetically not excitable metal in the ferromagnetic material of the retaining or supporting cylinder 22 whereby a cage effect is brought about.

By an appropriate selection of the permanent magnetic material the power factor can be adjusted according to the requirements. At loads which are lower than the ones set by the power factor, the induction motor will operate as a capacitive type in the form of an overexcited asynchronous motor, and when the load exceeds those associated with the selected operating point, then the VAR becomes substantially smaller than in the known induction motors.

The rotary element according to the present invention can be used in all induction motors. The motor output, the number of the winding poles, the number of the phases of the supply winding, the arrangement of the rotor are practically not limiting, since in the motor the additional rotary element can be used without any problem, and one may expect a considerable improvement of the energy properties and characters of the motor (a power factor of 0.95, that is, having a reduced VAR input).

I claim:

1. An induction motor comprising a stator having a stator winding and a rotor coupled with a motor shaft and separated from the stator winding by an air gap, wherein the rotor comprises a current conducting element and a magnetically excitable member, characterized in that in the air gap (13) between the stator (2) and the magnetically excitable member (4) a rotary element (6) is arranged which is supported in a free-running fashion with respect to the rotor and is made from a permanent magnetic material, wherein the rotary element (6) is constructed with segments (21) made from ferromagnetic material, which are premagnetized in a direction normal to the rotor and have the same number of poles as the stator winding (3).

2. The induction motor according to claim 1, characterized in that the rotary element (6) is arranged outside the current conducting element of the rotor.

3. The induction motor according to claim 1, characterized in that the rotary element (6) is arranged in an inner air gap (13) formed between the magnetically excitable body (4) and the stator.

4. The induction motor according to claim 1, characterized in that the rotary element (6) is supported by bearings (8, 18) on the rotor.

5. The induction motor according to claim 1, characterized in that the rotary element (6) is supported by bearings (8, 18) on the motor shaft.

6. The induction motor according to claim 1, characterized in that the rotary element (6) is supported by bearings (8, 18) on the stator (2).

7. The induction motor according to claim 1, characterized in that the rotary element (6) is constructed as a circular ring.

8. The induction motor according to claim 1, characterized in that the rotary element (6) is constructed as a roller.

9. The induction motor according to claim 1, characterized in that the ferromagnetic material of the rotary element (6) is arranged on an electrically conductive but magnetically not excitable material, selected from the group consisting of aluminum, copper, and constructed in the form of a supporting cylinder (22).

* * * * *